United States Patent [19]

Fuhrhop

[11] 4,161,413
[45] Jul. 17, 1979

[54] METHOD AND APPARATUS FOR PRODUCING A POST-MIXED, STABILIZED SCARFING PRE-HEATING FLAME

[75] Inventor: Ronald E. Fuhrhop, West Nyack, N.Y.

[73] Assignee: Union Carbide Corporation, New York, N.Y.

[21] Appl. No.: 921,810

[22] Filed: Jul. 3, 1978

Related U.S. Application Data

[63] Continuation-in-part of Ser. No. 836,512, Sep. 26, 1977, Pat. No. 4,115,154.

[51] Int. Cl.² .................... B23K 7/04; B23K 7/08
[52] U.S. Cl. .................................. 148/9.5; 266/51
[58] Field of Search ........................ 148/9.5; 266/51

[56] References Cited

U.S. PATENT DOCUMENTS

| | | | |
|---|---|---|---|
| 2,267,405 | 12/1941 | Jones et al. | 148/9.5 |
| 2,356,197 | 8/1944 | Jones et al. | 266/51 |
| 2,365,942 | 12/1944 | Crowe | 148/9.5 |
| 3,231,431 | 1/1966 | Allmang | 148/9.5 |
| 3,752,460 | 8/1973 | Lytle | 148/9.5 |
| 3,966,503 | 6/1976 | Engel | 148/9.5 |
| 4,115,154 | 9/1978 | Fuhrhop | 148/9.5 |

*Primary Examiner*—W. Stallard
*Attorney, Agent, or Firm*—Warrick E. Lee, Jr.

[57] ABSTRACT

A process for thermochemically scarfing a metal workpiece comprising:

preheating a spot on the surface of the workpiece where the scarfing reaction is to begin by directing a post-mixed preheating flame at the spot. The preheating flame is formed by:

(a) discharging at least one stream of preheat oxidizing gas and at least one stream of preheat fuel gas from separate ports in such a manner that the streams impinge external to their discharge ports, above the work surface and in such manner that the axes of the streams form an acute included angle between them, and (b) stabilizing said preheating flame by discharging a low-intensity stream of oxidizing gas. The stabilizing stream is directed in the same general direction as the direction of the flame or it may be directed such that the angle formed by the low intensity stream and the forward axis of the flame is from 10° to 90°. The low-intensity stream may pass proximate to or through the impingement of the preheat oxidizing gas and preheat fuel gas streams.

Steps (a) and (b) are continued until the spot reaches its oxidizing gas ignition temperature. Thereafter a stream of scarfing oxidizing gas is directed at an acute angle to the work surface at the preheated spot, while simultaneously relative movement is caused between the scarfing oxidizing gas stream and the work surface, thereby producing a scarfing cut.

Apparatus suitable for rapidly preheating with a stabilized flame is also disclosed.

13 Claims, 14 Drawing Figures

METHOD AND APPARATUS FOR PRODUCING A POST-MIXED, STABILIZED SCARFING PRE-HEATING FLAME

This application is a continuation-in-part of my U.S. Application Ser. No. 836,512, filed Sept. 26, 1977, now U.S. Pat. No. 4,115,154.

BACKGROUND

This invention relates to the thermochemical desurfacing of metal workpieces, commonly called scarfing. More specifically, this invention comprises a method and apparatus for preheating the surface of a metal workpiece where a scarfing reaction is to be started.

A complete scarfing cycle usually consists of three steps: (1) positioning the workpiece in register with the scarfing units, (2) preheating the workpiece to form a molten puddle, and (3) carrying out the scarfing reaction with a stream of scarfing oxygen while causing relative motion between the workpiece and the scarfing unit or units. This invention is concerned principally with the preheating step.

The prior art discloses several methods for performing the preheating step. Jones et al., in U.S. Pat. No. 2,267,405, discloses preheating with a flame produced by combining oxygen and fuel gas within a torch and igniting the gas mixture as it leaves the torch. The problem with combining oxygen and fuel gas within a torch, hereinafter referred to as "pre-mixing", is that the explosive mixture is subject to flashback, i.e. ignition inside the torch, which can damage the torch and become a safety hazard.

An improvement in the pre-mixed flame was disclosed by Jones et al. in U.S. Pat. No. 2,356,197, in which oxygen and fuel gas are combined just prior to being discharged from the nozzle. While this was an improvement in the state of the art, the apparatus was still subject to flashback. If the outer nozzle were to be plugged, e.g. with spattered metal, while the oxygen and fuel gas holes inside the unit remained open, the two gases could mix inside the unit, thereby creating an explosive mixture subject to flashback.

Allmang's U.S. Pat. No. 3,231,431 discloses post-mixed preheating apparatus wherein the oxygen and fuel gas are combined outside the unit, thereby completely eliminating the possibility of flashback. However, the intensity of the flame produced by this post-mixed apparatus is limited. While Allmang's method can be used to preheat hot workpieces, its low intensity flame requires an unacceptably long time to preheat cold workpieces.

Lytle's U.S. Pat. No. 3,752,460 discloses post-mixed preheating apparatus that uses a stream of "trap" oxygen to decrease preheating time. While Lytle's invention is an improvement over Allmang, Lytle's apparatus is not capable of preheating relatively cold workpieces fast enough for commercial operations.

Engel's U.S. Pat. No. 3,966,503 discloses a method for making an instantaneous scarfing start, that reduces the time required for preheating the workpiece virtually to zero. Engel's method is faster than the method of the present invention; however, Engel's method requires a rod feed mechanism and a high intensity jet of oxygen, not required by the present invention. Hence, the present invention is advantageous when an instantaneous scarfing start is not required, but a fast start on cold steel is desired.

Until the present invention, it has not been possible to rapidly preheat a portion of the surface of a relatively cold metal workpiece to scarfing temperature, using a flame, without danger of flashback, or without using rods, high intensity blowpipes or other adjuvant material.

OBJECTS

Accordingly, it is an object of this invention to provide a method as well as apparatus for scarfing the surface of a workpiece that provides acceptably short preheat times for scarfing relatively cold workpieces, without being subject to flashback, and without requiring adjuvant material.

It is another object of the present invention to provide a method as well as apparatus for producing a post-mixed scarfing preheating flame that is more intense than those produced by the prior art.

SUMMARY OF THE INVENTION

The above and other objects, which will readily be apparent to those skilled in the art, are achieved by the present invention, one aspect of which comprises:

A process for thermochemically scarfing a metal workpiece comprising:

(1) preheating a spot on the surface of the workpiece where the scarfing reaction is to begin by directing a post-mixed preheating flame at said spot, said preheating flame being formed by:

(a) discharging at least one stream of preheat oxidizing gas and at least one stream of preheat fuel gas from separate ports in such a manner that said streams impinge external to their discharge ports, above the work surface and in such manner that the axes of said streams form an acute included angle between them, and (b) stabilizing said preheating flame by discharging a low-intensity stream of oxidizing gas, the direction of said stabilizing stream being in the same general direction as the direction of said flame and proximate to the impingement of said preheat oxidizing gas and preheat fuel gas streams, and (c) continuing steps (a) and (b) until said spot reaches its oxidizing gas ignition temperature, and thereafter (2) directing a stream of scarfing oxidizing gas at an acute angle to the work surface at said preheated spot, while simultaneously (3) causing relative movement between said scarfing oxidizing gas stream and said work surface, thereby producing a scarfing cut.

A second aspect of the invention comprises:

Scarfing apparatus comprising: (a) means for forming a post-mixed preheating flame, (b) means for discharging a stream of scarfing oxidizing gas through a scarfing nozzle, and (c) means for producing relative motion between the scarfing oxidizing gas and a workpiece, characterized in that said means for forming said preheating flame comprises:

(1) orifice means for discharging a stream of preheat fuel gas, the axis of said orifice means being directed toward the workpiece to be scarfed, (2) orifice means for discharging a stream of preheat oxidizing gas, the axis of said orifice being directed to intersect the axis of said preheat fuel gas orifice means at an acute included angle, external to said orifices and above the surface of the workpiece, and (3) means for discharging a low-intensity stream of stabilizing oxidizing gas, said means comprising an orifice, the axis of which is directed proximate to the intersection of the axes of said preheat fuel gas orifice and said preheat oxidizing gas orifice and directed in the same general direction as the resultant of said axes.

In other embodiments of the invention, the low-intensity stream of oxidizing gas may pass through the impingement of the two preheat streams and/or the low-intensity stream may form an angle at from 10° to 90° with the forward axis of the flame.

The preferred oxidizing gas is oxygen and the preferred included angle of impingement between the preheat gas streams is from 5° to 50°. The preferred embodiment uses the same orifice to discharge the preheat stabilizing oxygen stream as well as the scarfing oxygen stream.

The term "oxidizing gas" as used throughout the present specification and claims is used to mean a gas containing an oxidizing agent. The preferred oxidizing gas is commercially pure oxygen, and for simplicity the term "oxygen" is used hereafter throughout the specification. However, the invention may be practiced using oxidizing gases other than pure oxygen. For example, the oxidizing gas for scarfing and stabilizing can be oxygen having a purity as low as 99 percent, or lower. However, the results will be poorer with impure oxygen, especially with oxygen of less than 99 percent purity. The preheat oxidizing gas can contain as low as 21 percent oxygen, i.e. it can be air, but preheat times will increase with decreasing oxygen percentage in the preheat oxidizing gas stream.

The term "preheat" is used to mean bringing a portion of the surface of a workpiece to its oxidizing gas ignition temperature; that is, the temperature at which the work-piece will ignite when in an atmosphere of oxidizing gas.

DETAILED DESCRIPTION OF THE INVENTION

Figure 1:
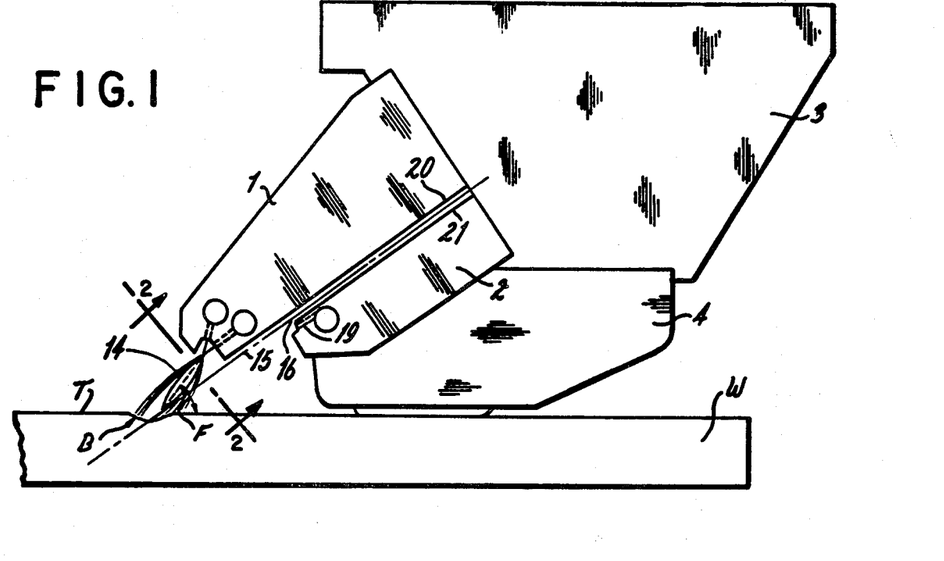
FIG. 1 is a side view of a scarfing unit illustrating a preferred embodiment of the present invention.
Figures 2, 4, 5:
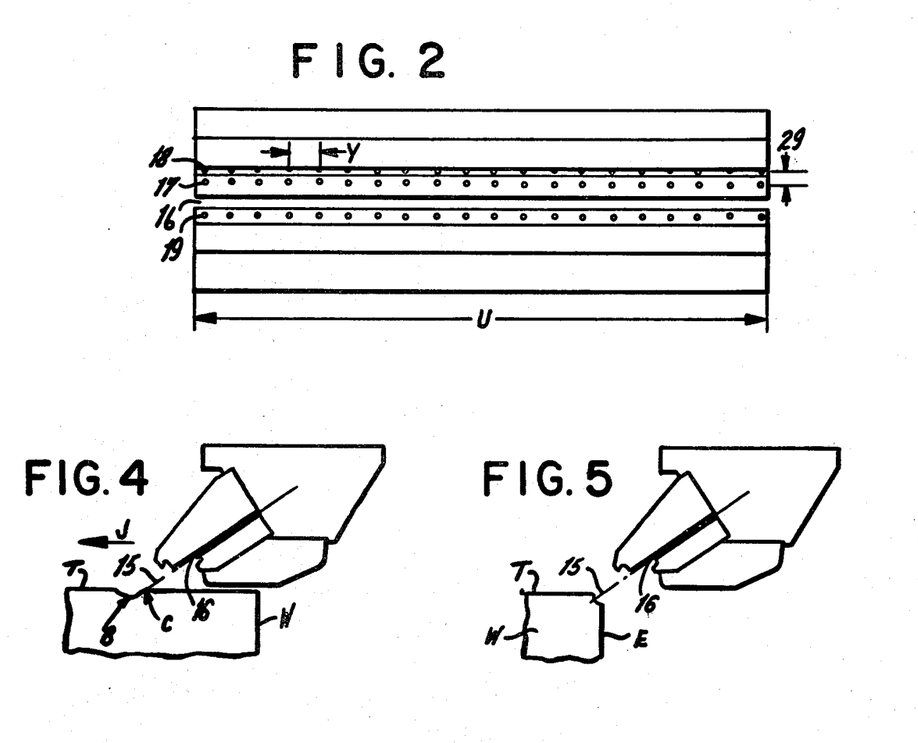
FIG. 2 is a sectional view of FIG. 1 viewed along line 2—2.
FIG. 4 illustrates the preferred location of the molten puddle with respect to the scarfing oxygen stream for scarfing starts on the flat portion of a work surface.
FIG. 5 illustrates a start on the end of a work surface.
Figures 3, 6:
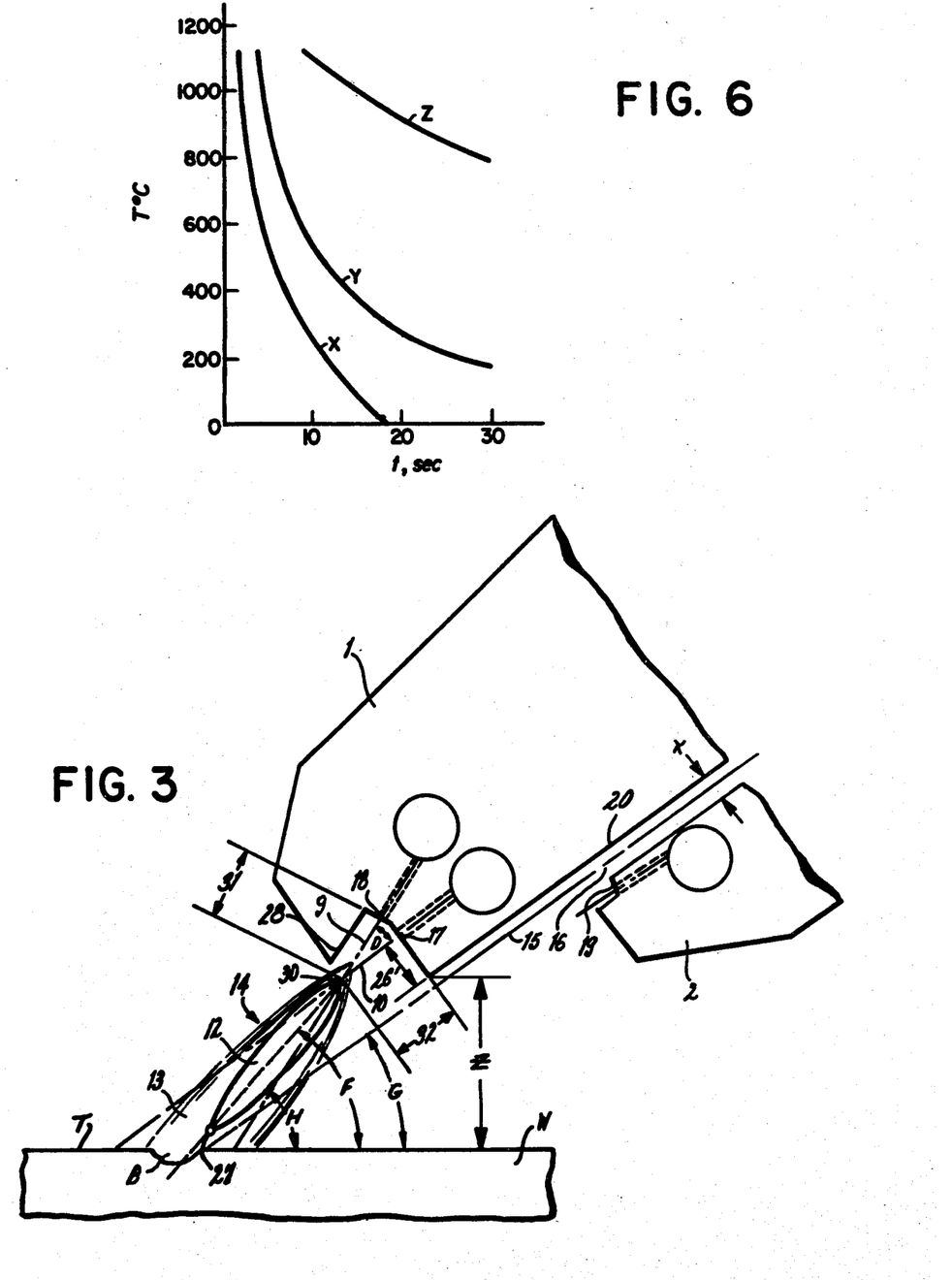
FIG. 3 is an enlarged side view of FIG. 1 illustrating the key elements of the invention.
FIG. 6 graphically compares the preheat time obtained by practice of the present invention with prior art methods of preheating the work surface.

FIGS. 1, 2 and 3 illustrate a preferred embodiment of the invention. A typical scarfing unit is comprised of an upper preheat block 1, a lower preheat block 2, a head 3, and a shoe 4. The blocks 2 and 3 are called preheat blocks because preheating flames are discharged from these blocks in conventional apparatus. However, in the apparatus illustrated in FIGS. 1, 2 and 3, only the flames discharged from the upper preheat block are used for preheating. A slot-like scarfing nozzle 16, from which a sheet-like stream of scarfing oxygen is discharged, is formed by the lower surface 20 of the upper preheat block 1 and the upper surface 21 of the lower preheat block 2. The lower preheat block 2 is provided with a row of fuel gas ports 19, communicating with conventional suitable gas passages (not shown). Oxygen and fuel gas are supplied to head 3 through pipes (not shown) and then to the respective gas passages by means well known in the art. The shoe 4 rides on the surface of the workpiece W during scarfing to keep the scarfing nozzle positioned a constant distance Z (FIG. 3) from the work surface. The scarfing reaction is carried out by impinging on a molten puddle a sheet-like stream of scarfing oxygen discharged from nozzle 16 at an acute angle to the work surface, while relative motion is caused to take place between the workpiece and the scarfing unit.

In accordance with the invention, the upper preheat block is provided with a row of preheat fuel gas ports 17 and a row of preheat oxygen ports 18, each of said ports communicating with supply passages (not shown) for fuel and oxygen, respectively. While the drawing shows the preheat oxygen ports 18 located above the preheat fuel gas ports 17, the reverse arrangement, although not preferred, will also work. More generally, it is preferred that the preheat fuel gas ports be located between the preheat oxygen ports and the below-described stabilizing oxygen port, but different arrangements are operable.

The apparatus functions as follows. Preheat oxygen streams 9 from ports 18 and preheat fuel gas streams 10 from ports 17 impinge forming a combustible mixture. The impingement appears as a point 30 in FIG. 3. Upon ignition, the combustible mixture forms a flame 14, having a low intensity zone 13 and a high intensity zone 12. It has been found that the high intensity zone 12 may be lengthened so that its tip 27 is just above the surface of the workpiece W, thereby producing a longer, more intense flame, by stabilizing the preheat flame by providing a low intensity stream of oxygen that passes proximate to the point of impingement 30 and in the same general direction as the flame 14. By passing the low intensity stream 15 "proximate to" the point of impingement is meant that the stream should pass close to the point of impingement 30, but not through it. While the term "point of impingement" has been used, it should be recognized that the term "locus of impingement" would be more accurate, since there are many intersecting streams, hence many points of impingement; and furthermore, since the streams have thickness, the intersections are areas rather than merely points. Hence, for brevity, the term "impingement" is used throughout the specification and claims to mean the locus of the areas of impingement of the preheat fuel gas and preheat oxidizing gas streams. The preferred source of the stabilizing oxygen stream 15 is scarfing nozzle 16. Conventional valve means (not shown) are provided for producing the low intensity stream of oxygen 15 (lower in intensity than a scarfing oxygen stream) through scarfing nozzle 16.

The stream 15 should be directed in the same general direction as the flame. That is, if stream 15 were resolved into two vector components, one parallel to and one perpendicular to the direction of the flame, the vector component the flame. When practicing the embodiment of the invention illustrated in FIG. 3 with the preferred values of Tables I and II, the flame will be close to the resultant of (or more correctly, the bisector of the angle formed by) the axes of the preheat oxygen and preheat fuel gas ports. Preferably, the projections of the axes of stream 15 and flame 14 cross forming an acute included angle as illustrated in FIGS. 1 and 3. It is also preferable that the axis of the stabilizing stream 15 be parallel to that of the preheat fuel gas stream, as also shown in FIGS. 1 and 3.

The preheat fuel gas and oxygen streams must impinge at an acute angle, i.e. at an angle greater than 0° but less than 90°. The preferred range is 5° to 50°, and the most preferred impingement angle is 15°.

The stabilizing oxygen stream 15 from nozzle 16 must be of low intensity, i.e. with a lower nozzle velocity than that of the preheat oxygen and fuel gas from nozzles 18 and 17. Preferably, the nozzle velocity of the stabilizing oxygen is about 10% of that of the preheat streams.

If the preheat flame were not stabilized as described above, the length of the high intensity zone (from the impingement 30 to tip 27) would be so short that the preheating step could not be performed in acceptably short times unless the stand-off distance Z were reduced. Reducing the stand-off distance Z to bring the tip of the high intensity zone of an unstabilized flame close to the workpiece would subject the scarfing unit to much more damage from spattered metal and slag than occurs at normal stand-off distances.

Flames produced by fuel gas from lower ports 19 mixing with oxygen from nozzle 16, are used to sustain the scarfing reaction. These flames are not necessary during preheat, but fuel gas should flow from ports 19 during preheat to prevent their plugging.

After the molten puddle forms at spot B, the valve means controlling oxygen flow from slot 16 are adjusted to increase the intensity of the oxygen flow from low intensity to scarfing intensity, and relative motion between the workpiece and the scarfing unit is started, thereby producing a scarfing cut on the surface of the workpiece. During the scarfing operation, the preheat flames formed by streams 9 and 10 are left on at a lower intensity than during preheat to help sustain the scarfing reaction. A baffle 28 positioned above preheat ports 17 and 18, is used to prevent blow-off of the low intensity flame during scarfing.

There are several design variables to be decided upon when fabricating the apparatus of the present invention, many of which are not independent of each other. For conventional scarfing apparatus, the following are usually fixed:

(1) G, the angle between the scarfing oxygen and surface of the workpiece, (2) X, the height of nozzle 16,
(3) Z, the standoff distance,
(4) U, the width of the scarfing unit, (see FIG. 2),
(5) the type of fuel gas available,
(6) the type of oxidizing gas available.

For each set of values for the above parameters, there will be an operable range and a preferred value for the variables used in designing preheating apparatus in accordance with the invention.

The following two tables give examples of values that have been found satisfactory for practicing the invention. Table I lists a set of typical values of parameters for conventional scarfing equipment, known to produce good scarfing.

TABLE I

| | |
|---|---|
| G, scarfing oxygen angle | 35° |
| X, height of nozzle 16 | 5.6 mm |
| Z, standoff distance | 25 mm |
| U, width of scarfing unit | 270 mm |
| fuel gas | natural gas |
| oxidizing gas | oxygen |

Table II gives the operable range and the preferred value of the variables found useful for practicing the invention when the fixed parameters are those shown in Table I.

TABLE II

| Variable | Preferred Value | Approximate Operable Range |
|---|---|---|
| Diameter of preheat fuel gas ports 17: | 1.0 mm | 0.7 – 1.7 mm |
| Preheat fuel gas flow rate per port: | 1.7 SCMH | 1 – 3.5 SCMH |
| Spacing of preheat fuel gas ports (dimension Y, in FIG. 2) | 6.0 mm | 3 – 16 mm |
| Diameter of preheat oxygen ports 18 | 1.6 mm | 1 – 2.3 mm |
| Preheat oxygen flow rate per port: | 3.7 SCMH | 1.5 – 6 SCMH |
| Spacing of preheat oxygen gas ports (dimension Y, in FIG. 2) | 6.0 mm | 3 – 16 mm |
| Impingement angle between axes of preheat fuel ports and preheat oxygen gas ports (angle D, in FIG. 3) | 15° | 5° – 50° |
| Distance 26 between surface 20 and preheat fuel gas ports 17 | 10 mm | 3 – 15 mm |
| Angle between preheat oxygen port axis and workpiece (angle H, in FIG. 3) | 50° | 40° – 75° |
| Distances 31 and 32 from impingement 30 to preheat ports | 15 mm | 3 – 22 mm |
| Distances 29 (see FIG. 2) between center lines of port 17 and port 18 | 4 mm | 1.5 – 6 mm |
| Stabilizing Oxygen flow rate from slot 16 during preheating, per cm of slot width | 6 SCMH | 3 – 10 SCMH |

The variables shown in Table II are dependent upon each other. Therefore, if any are made significantly different from the preferred value, the preferred value and operable range of other variables may change. Of course, if any of the fixed parameters of Table I are changed, the preferred and operable ranges of some of the variables in Table II may change. Those skilled in the art will recognize that an almost limitless number of combinations of values for Tables I and II will give satisfactory results.

Figure 10:
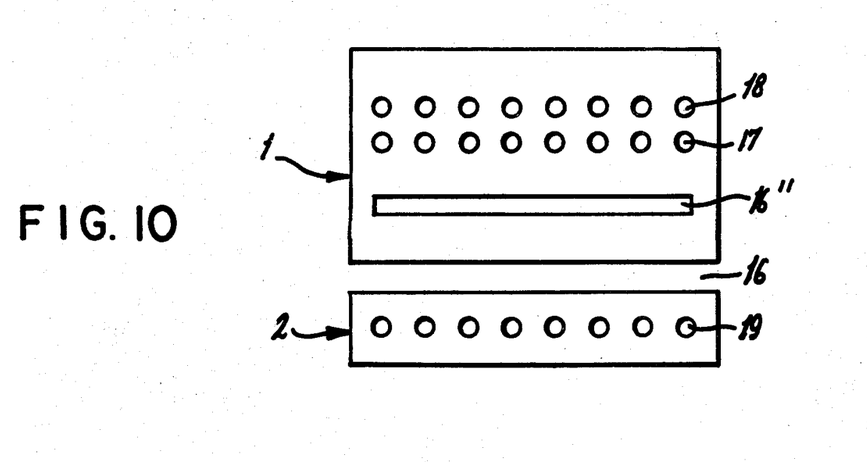
FIG. 10 is a front view of an alternate method of constructing the apparatus of FIG. 8.

The preferred shape of ports 17 and 18 is circular, but other shapes will work. For example, the ports could be square or rectangular. A single elongated preheat oxygen nozzle could be used with a single elongated preheat fuel gas nozzle, although such an arrangement is not preferred. The invention works best, however, if a plurality of oxygen and fuel gas ports are provided, arranged in rows opposite each other as illustrated in FIGS. 2 and 10. If a plurality of preheat ports are used, the port spacing, dimension y in FIG. 2, should be uniform. Each oxygen port 18 should be directly opposite a fuel gas port 17. This preferred arrangement gives the most uniform and fastest preheat, however, non-uniform port spacing or staggered fuel gas and oxygen ports or both will also work.

The flame angle F, i.e. the angle formed by the axis of the flame 14 with respect to the surface of the workpiece W should be between 40° and 55°, for a standoff distance Z of 25 mm. If angle F exceeds 55°, the flame tends to gouge the workpiece. If angle F is less than 40°, the tip 27 of the high intensity zone 12 will be too far from the work surface T to give desirably short preheat times. The flame angle F is determined by the values of the parameters in Tables I and II. The above-enumerated preferred values of the variables will give a satisfactory flame angle, but those skilled in the art will recognize that many other successful combinations are possible.

The invention works best if the preheat fuel gas and oxygen ports are as close to each other as possible without the gases converging within the unit, thereby creating the possibility of premixing and flashback.

FIG. 4 illustrates the preferred location of starter puddle B with respect to the center line projection of axis 15 of scarfing oxygen nozzle 16, when making starts on the top surface T of a workpiece W. As illustrated in FIG. 4, the oxygen stream from slot 16 should impinge on the rear end C of starting puddle B with respect to the direction of the scarfing cut indicated by arrow J. This location of the starting puddle allows all the molten material from the puddle to be blown forward, thereby leaving none to form ridges or fins at the rear of the cut.

If a start on the end of the workpiece W is to be made, as shown in FIG. 5, then the results will be satisfactory if the scarfing oxygen stream from slot 16 impinges on any part of the starting puddle, since there is no work surface T to the rear of the puddle on which ridges may form and it does not matter if fins are formed on the end surface E.

FIGS. 7 through 10 illustrate alternative embodiments of the invention which, although not the preferred, are nevertheless capable of producing a stabilized post-mixed preheat flame.

Figure 7:
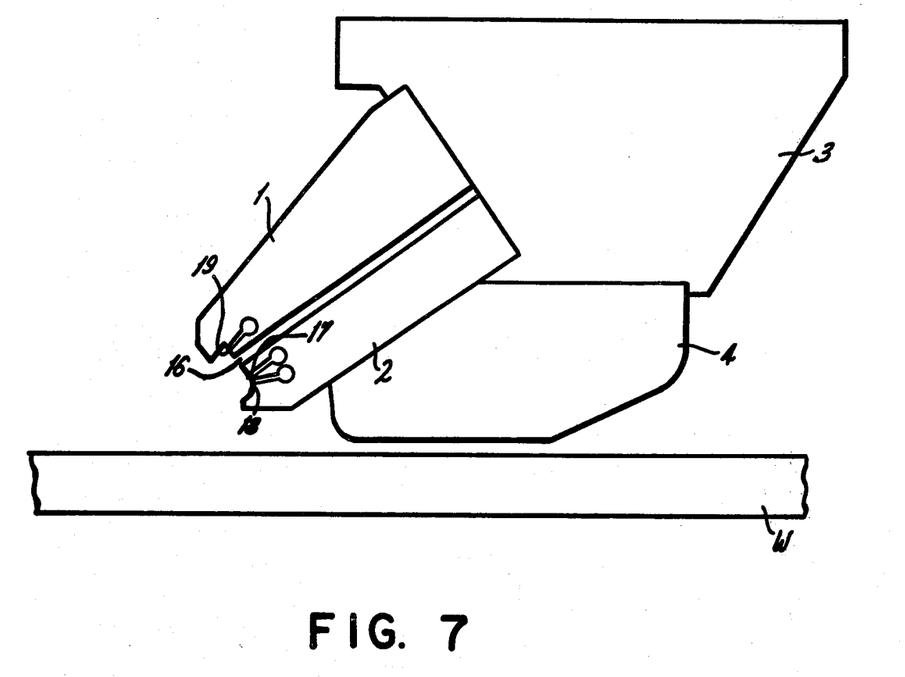
FIG. 7 illustrates an embodiment of the invention in which the preheat streams are discharged from the lower preheat block of the scarfing apparatus.

FIG. 7 is a side view of a scarfing unit that is similar to that shown in FIGS. 1, 2 and 3, except that the preheat oxygen and fuel gas ports, 18 and 17, respectively, are located in the lower preheat block 2. The apparatus functions similarly to the apparatus of FIGS. 1, 2 and 3.

Figure 8:
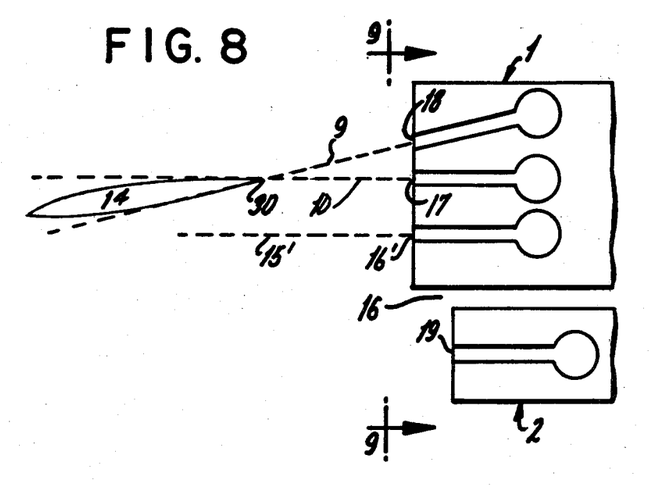
FIG. 8 is a side view of apparatus having separate stabilizing oxygen and scarfing oxygen ports.
Figure 9:
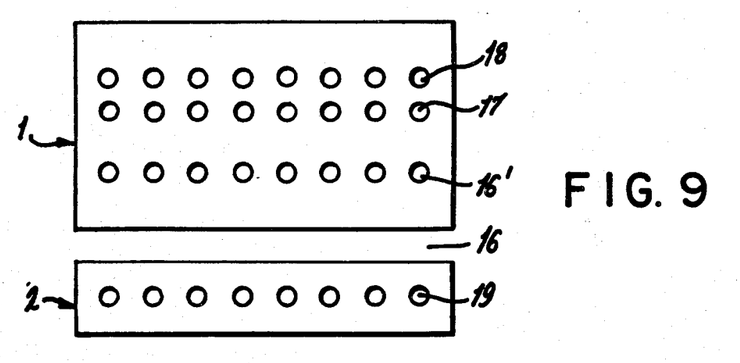
FIG. 9 is a front view of the apparatus of FIG. 8 viewed along the lines 9—9.

FIGS. 8 and 9 show an arrangement in which the stabilizing oxygen is supplied from port 16' separate from scarfing oxygen slot 16. Here a stream of preheat oxygen 9 from port 18, impinges upon a stream of preheat fuel gas 10 from port 17 to form a post-mixed flame 14. The flame is stabilized by a low-intensity stream of oxygen 15' from port 16', directed proximate to the impingement 30, and in the general direction of the flame. The preheat and stabilizing ports 17, 18 and 16' are shown located in upper preheat block 1. They could also have been located in lower preheat block 2. After preheating is accomplished, a stream of scarfing oxygen from slot 16 is turned on to scarf the workpiece. As described previously, fuel gas discharged from port 19 helps sustain the scarfing reaction.

FIG. 10 is the same as FIG. 9, except that the stabilizing oxygen originates from an elongated, slot-like nozzle 16''. The preheat oxygen and fuel could also be supplied from elongated, slot-like nozzles, although such an arrangement is not preferred.

Figure 11:
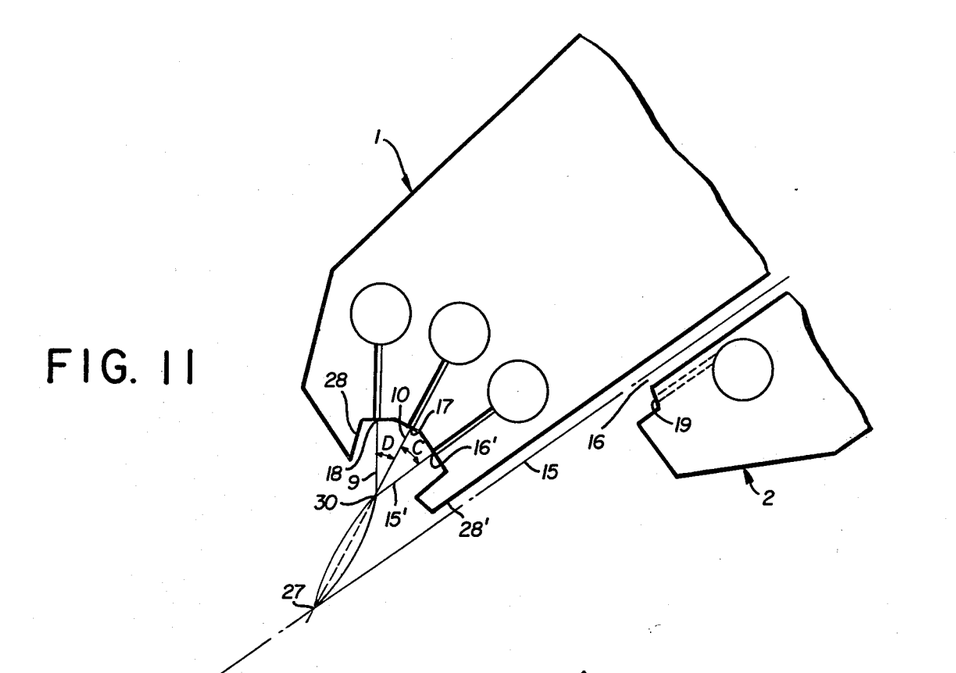
FIG. 11 is a side view of apparatus having separate stabilizing oxygen and scarfing oxygen ports wherein the stabilizing and preheat streams impinge on a common locus.

FIG. 11 is a side view of apparatus having stabilizing oxygen ports 16' separate from scarfing oxygen port 16, similar to FIG. 8. However, the stabilizing oxygen stream 15' passes through the impingement 30 of preheat oxygen stream 9 and preheat fuel gas stream 10. It has been found that baffles 28 and 28', while not absolutely necessary, increase the range over which the flow rates of the preheat and stabilizing streams may be varied and still produce a stabilized flame. If the fuel gas port is not between the preheat and stabilizing oxygen port, a baffle near to the fuel gas port is especially helpful.

Figure 12:
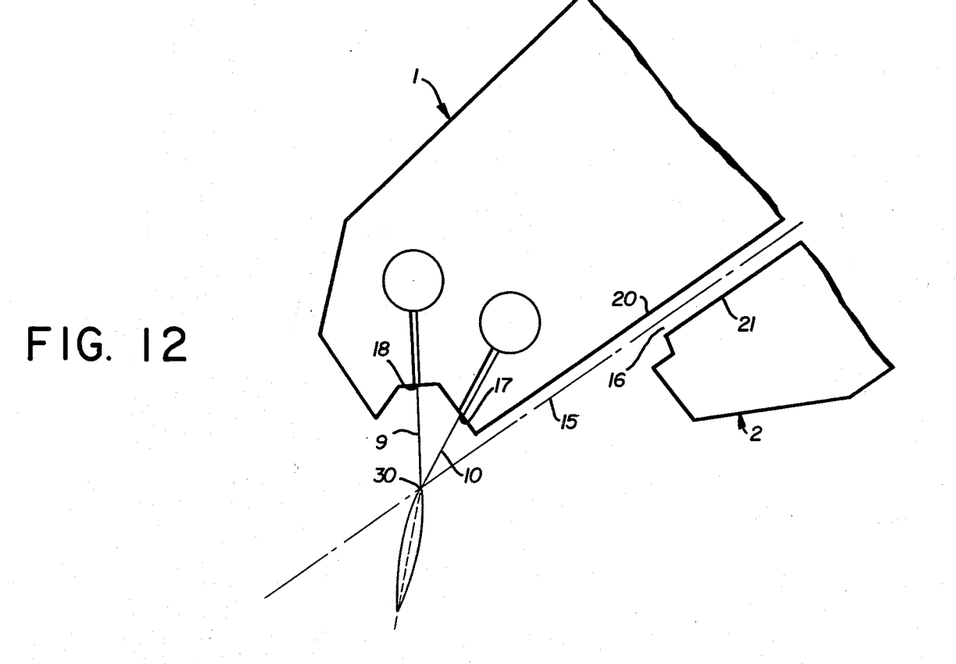
FIG. 12 is a side view of apparatus similar to that of FIG. 3, but with the stabilizing and preheat streams impinging on a common locus.

FIG. 12 is a side view of apparatus in which both the stabilizing and scarfing oxygen are discharged from the same nozzle, nozzle 16, as in FIG. 3. However, in FIG. 12, the stabilizing oxygen passes through the impingement of the preheat streams. This arrangement, although not as preferable as that of FIG. 3, is also capable of producing a stabilized preheat flame, provided that impingement 30 is located above the workpiece (not shown).

It is preferred that the stabilizing oxygen stream be directed in the same general direction as the flame. As stated previously, this means that, if the stabilizing oxygen stream use resolved into two vector components, one parallel to and one perpendicular to the direction of the flame, the vector component parallel to the flame will point in the same direction as the flame. However, it has been found that a stabilized flame, capable of producing short preheat time, can be formed if the stabilizing oxygen stream is directed perpendicular to the flame or even opposite to the general direction of the flame.

Figure 13:
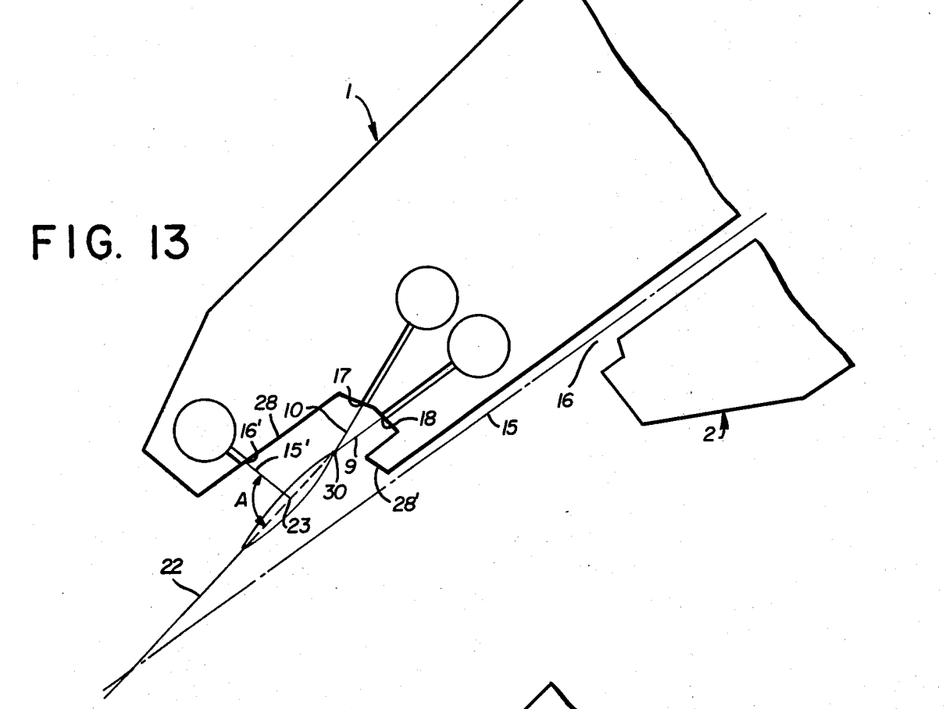
FIG. 13 is a side view of apparatus in which the stabilizing stream is directed proximate to the impingement of the preheat streams, but not in the same general direction as the flame.

FIG. 13 is a side view of apparatus in which the stabilizing oxygen stream 15' is not directed in the same general direction as the flame. Here preheat oxygen stream 9 and preheat fuel gas stream 10 impinge at impingement 30 as described previously, forming post mixed flame 14 having forward axis 22, defined as the line segment of the central axis of the flame lying ahead of the point (23) at which the stabilizing stream crosses the central axis of the flame. The term "ahead of" is intended to mean the same direction pointed to by the "V" formed by the impingement of the preheat streams. Hence, if the stabilizing oxygen stream forms an angle A of more than 90° with the forward axis of the flame, the stabilizing stream is directed in the same general direction as the flame. However, it has been found that even if angle A is between 10° and 90°, a stabilized flame may still be produced. It should be noted that the location of the flame with respect to the forward resultant of (i.e. the bisector of the angle between) the preheat port axes is influenced by the direction, velocity, and flow rate of the stabilizing oxygen. In FIG. 13, the stabilizing oxygen stream 15' passes proximate to the impingement of the preheat streams ahead of the impingement. Satisfactory results may also be achieved if the stabilizing stream is directed behind the impingement.

Figure 14:
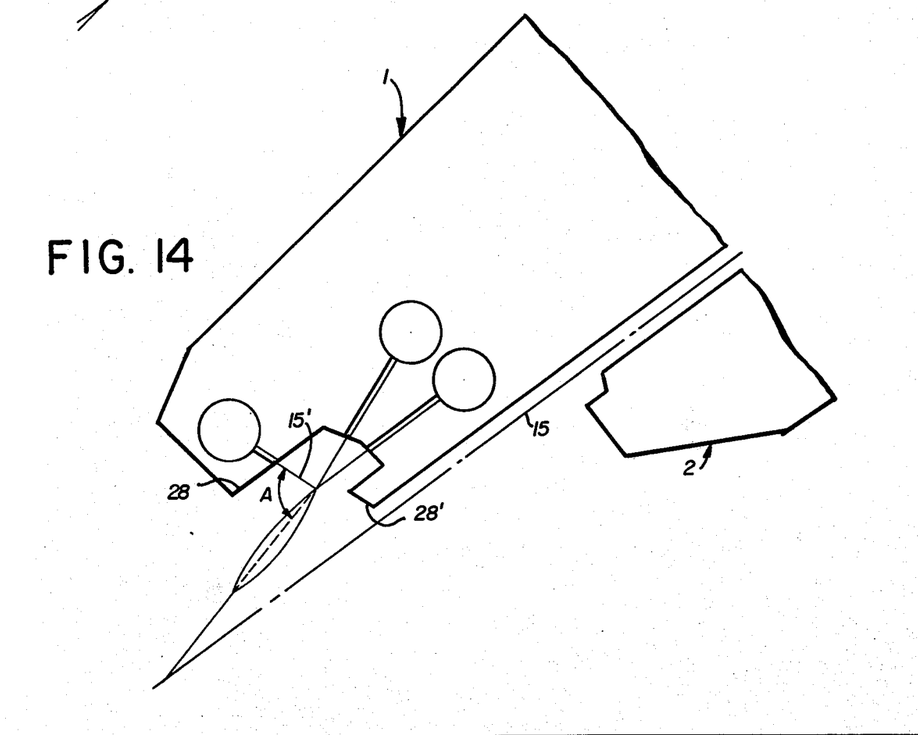
FIG. 14 is a side view of apparatus similar to that of FIG. 13, but with the stabilizing stream passing through the impingement of the preheat streams.

FIG. 14 is a side view of apparatus similar to that of FIG. 13 except that stabilizing oxygen stream 15' passes through the impingement of the preheat streams. This arrangement is also capable of producing satisfactory results.

While not wishing to be tied to a particular theory, the following explanation of how the invention achieves shorter preheat times is submitted. It has been observed that an unstabilized post mixed flame, formed by the impingement of preheat fuel gas and preheat oxygen only, tends to have a relatively large low-intensity zone and a very small high-intensity zone. In some cases, no high intensity zone can be perceived. Moreover an unstabilized post mixed flame tends to flutter. If an attempt is made to increase the intensity of an unstabilized flame by increasing the flow of the preheat oxygen and preheat fuel gas, fluttering becomes more pronounced. Finally the unstabilized flame is blown away from the preheat discharge ports by the increased gas flow and is extinguished. It has been observed that baffles help hold the flame in position and allow somewhat higher preheat gas flow rates before the flame is extinguished.

When a post-mixed flame is stabilized by a low-intensity stream of oxygen, in accordance with the invention, the stabilized flame very quickly develops a long, distinctive high intensity zone and fluttering stops. The flame remains stable even though the flows of preheat fuel gas and preheat oxygen are increased to rates higher than those which extinguished the unstabilized flame. The beneficial effect of the stabilizing stream, particularly when directed as illustrated in FIG. 3, is believed to be achieved because:

(1) Since the stabilizing oxygen is added with a low-intensity stream, it does not interfere with the external mixing of the preheat oxygen and preheat fuel gas streams. Yet it adds oxygen that helps support combustion and provides an oxygen atmosphere surrounding the high-intensity zone of the flame. This oxygen atmosphere provides an excellent medium for the flame to propagate back toward the preheat discharge ports, igniting unburnt fuel gas closer to said ports.

(2) The stabilizing oxygen stream also forms a shield to protect the flame from air, which does not provide as good a flame propagation medium as oxygen and causes the flame to become unstable and blow away from the preheat discharge ports.

EXAMPLES BASED ON TABLES I and II

Scarfing starts on the top surface of a workpiece, as shown in FIG. 4, were made, in the laboratory, using apparatus having the values set forth in Table I and the preferred values of Table II. The test results are graphically represented by curve X in FIG. 6, in which the initial temperature (T° C.), of the workpiece is plotted along one axis, while the preheat time required (t) in seconds, is plotted along the other axis. For purposes of comparison, curve Y shows the results obtained under comparable conditions using the scarfing apparatus disclosed by Lytle in U.S. Pat. No. 3,752,460, while curve Z shows the results obtainable by a conventional post-mixed preheat flame formed by oxygen discharged from the scarfing nozzle and fuel jets, such as disclosed by Allmang in U.S. Pat. No. 3,231,431.

As illustrated by FIG. 6, for cold workpieces, the present invention is a significant improvement over prior art preheating methods, giving preheating times less than half that required by the Lytle method for workpieces above 200° C. For workpieces below 200° C., the present invention requires significantly less than half the preheat time of the Lytle method. Note that the graph indicates that the trap oxygen method of Lytle is unable to achieve preheat times below 20 seconds for workpieces below 250° C., while the present invention requires less than 20 seconds to preheat a work-piece at 0° C.

EXAMPLE BASED ON FIG. 11

A post-mixed stabilized flame was produced by impinging the two preheat streams and a stabilizing stream at a common locus as shown in FIG. 11. Table III gives an operable range and preferred values of variables useful for practicing the invention. As in Table II, the variables are dependant on each other. Deviation from the preferred value of one may change the operable range and preferred values of other variables.

TABLE III

| Variable | Preferred Value | Approximate Operable Range |
| --- | --- | --- |
| Angle C (FIG. 11) | 25° | 5–90° |
| Distance from impingement 30 to preheat and stabilizing oxygen ports | 15mm | 3–22mm |
| Stabilizing Oxygen port 15' Diameter | 2mm | 1–6mm |
| Flow Rate per port | 1.3 SCMH | 1–4 SCMH |

The preferred values of variables not listed in Table III are the same as those listed in Table II.

EXAMPLE BASED ON FIG. 13

Table IV gives an operable range and preferred values of variables useful for practicing the invention in accordance with FIG. 13.

TABLE IV

| Variable | Preferred Value | Approximate Operable Range |
| --- | --- | --- |
| Distances from impingement 30 to preheat and stabilizing oxygen ports | 15mm | 3–22mm |
| Stabilizing Oxygen port 15' Diameter | 2mm | 1–6 |
| Flow Rate per Port | 1.3 SCMH | 1–4 SCMH |
| Angle A | 80° | 10–90° |

As with the previous Tables, the values are dependent on each other. Changing one value may change the range of others. The preferred values of variables not listed in Table IV are the same as those listed in Table II.

What is claimed is:

1. A process for thermochemically scarfing a metal workpiece comprising:
   (1) preheating a spot on the surface of the workpiece where the scarfing reaction is to begin by directing a post-mixed preheating flame at said spot, said preheating flame being formed by:
      (a) discharging at least one stream of preheat oxidizing gas and at least one stream of preheat fuel gas from separate ports in such a manner that said streams impinge external to their discharge ports, above the work surface and in such manner that the axes of said streams form an acute included angle between them, and (b) stabilizing said preheating flame by discharging a low-intensity stream of oxidizing gas, the direction of said stabilizing stream being in the same general direction as the direction of said flame and through the impingement of said preheat oxidizing gas and preheat fuel gas streams, and (c) continuing steps (a) and (b) until said spot reaches its oxidizing gas ignition temperature, and thereafter (2) directing a stream of scarfing oxidizing gas at an acute angle to the work surface at said preheated spot, while simultaneously (3) causing relative movement between said scarfing oxidizing gas stream and said work surface, thereby producing a scarfing cut.

2. A process for thermochemically scarfing a metal workpiece comprising:

(1) preheating a spot on the surface of the workpiece where the scarfing reaction is to begin by directing a post-mixed preheating flame at said spot, said preheating flame being formed by:

(a) discharging at least one stream of preheat oxidizing gas and at least one stream of preheat fuel gas from separate ports in such a manner that said streams impinge external to their discharge ports, above the work surface and in such manner that the axes of said streams form an acute included angle between them, and (b) stabilizing said preheating flame by discharging a low-intensity stream of oxidizing gas which forms an angle of between 10° and 90° with the forward axis of said flame, and passes proximate to the impingement of said preheat oxidizing gas and preheat fuel gas streams, and (c) continuing steps (a) and (b) until said spot reaches its oxidizing gas ignition temperature, and thereafter (2) directing a stream of scarfing oxidizing gas at an acute angle to the work surface at said preheated spot, while simultaneously (3) causing relative movement between said scarfing oxidizing gas stream and said work surface, thereby producing a scarfing cut.

3. A process for thermochemically scarfing a metal workpiece comprising:

(1) preheating a spot on the surface of the workpiece where the scarfing reaction is to begin by directing a post-mixed preheating flame at said spot, said preheating flame being formed by:

(a) discharging at least one stream of preheat oxidizing gas and at least one stream of preheat fuel gas from separate ports in such a manner that said streams impinge external to their discharge ports, above the work surface and in such manner that the axes of said streams form an acute included angle between them, and (b) stabilizing said preheating flame by discharging a low-intensity stream of oxidizing gas which forms an angle of between 10° and 90° with the forward axis of said flame and passes through the impingement of said preheat oxidizing gas and preheat fuel gas streams, and (c) continuing steps (a) and (b) until said spot reaches its oxidizing gas ignition temperature, and thereafter (2) directing a stream of scarfing oxidizing gas at an acute angle to the work surface at said preheated spot, while simultaneously (3) causing relative movement between said scarfing oxidizing gas stream and said work surface, thereby producing a scarfing cut.

4. The process of claim 1 wherein said stabilizing oxidizing gas and said scarfing oxidizing gas are discharged from the same port.

5. The process of claim 1 wherein said acute included angle is between 5° and 50°, the preheat fuel gas flow rate is from 1 to 3.5 SCMH per stream, the preheat oxidizing gas flow rate is from 1.5 to 6 SCMH per stream, and the stabilizing oxidizing gas flow rate is from 3 to 10 SCMH per stream.

6. The process of claim 2 wherein said acute included angle is between 5° and 50°, the preheat fuel gas flow rate is from 1 to 3.5 SCMH per stream, the preheat oxidizing gas flow rate is from 1.5 to 6 SCMH per stream, and the stabilizing oxidizing gas flow rate is from 3 to 10 SCMH per stream.

7. Scarfing apparatus comprising: (a) means for forming a post-mixed preheating flame, and (b) means for discharging a stream of scarfing oxidizing gas through a scarfing nozzle, characterized in that said means for forming said preheating flame comprises:

(1) orifice means for discharging a stream of preheat fuel gas, the axis of said orifice means being directed toward the workpiece to be scarfed, (2) orifice means for discharging a stream of preheat oxidizing gas, the axis of said orifice being directed to intersect the axis of said preheat fuel gas orifice means at an acute included angle, external to said orifices and above the surface of the workpiece, and (3) means for discharging a low-intensity stream of stabilizing oxidizing gas, said means comprising an orifice, the axis of which is directed through the intersection of the axes of said preheat fuel gas orifice and said preheat oxidizing gas orifice and directed in the same general direction as the resultant of said axes.

8. The apparatus of claim 7 further comprising means for producing relative motion between the scarfing oxidizing gas discharge means and said workpiece.

9. Scarfing apparatus comprising: (a) means for forming a post-mixed preheating flame, and (b) means for discharging a stream of scarfing oxidizing gas through a scarfing nozzle, characterized in that said means for forming said preheating flame comprises:

(1) orifice means for discharging a stream of preheat fuel gas, the axis of said orifice means being directed toward the workpiece to be scarfed, (2) orifice means for discharging a stream of preheat oxidizing gas, the axis of said orifice being directed to intersect the axis of said preheat fuel gas orifice means at an acute included angle, external to said orifices and above the surface of the workpiece, and (3) means for discharging a low-intensity stream of stabilizing oxidizing gas, said means comprising an orifice, the axis of which is directed proximate to the intersection of the axes of said preheat fuel gas orifice and said preheat oxidizing gas orifice and directed such that the axis of said stabilizing oxidizing gas discharge means forms an angle of between 10° and 90° with the forward resultant of the axes of said preheat fuel gas and preheat oxidizing gas orifice means.

10. The apparatus of claim 9 further comprising means for producing relative motion between the scarfing oxidizing gas discharge means and said workpiece.

11. Scarfing apparatus comprising: (a) means for forming a post-mixed preheating flame and (b) means for discharging a stream of scarfing oxidizing gas through a scarfing nozzle, characterized in that said means for forming said preheating flame comprises:

(1) orifice means for discharging a stream of preheat fuel gas, the axis of said orifice means being directed toward a workpiece to be scarfed, (2) orifice means for discharging a stream of preheat oxidizing gas, the axis of said orifice being directed to intersect the axis of said preheat fuel gas orifice means at an acute included angle, external to said orifices and above the surface of the workpiece, and (3) means for discharging a low-intensity stream of stabilizing oxidizing gas, said means comprising an orifice, the axis of which is directed through the intersection of the axes of said preheat fuel gas orifice and said preheat oxidizing gas orifice and directed such that the axis of said stabilizing gas discharge means forms the angle of between 10° and 90° with the forward resultant of the axes of said preheat fuel gas and preheat oxidizing gas orifice means.

12. The apparatus of claim 11 further comprising means for producing relative motion between the scarfing oxidizing gas discharge means and said workpiece.

13. The apparatus of claim 7 wherein said means for discharging stabilizing oxidizing gas and said means for discharging a stream of scarfing oxidizing gas comprise a common discharge port.

* * * * *